United States Patent Office 3,287,425
Patented Nov. 22, 1966

3,287,425
FLUORINATED COMPOUNDS AND THEIR
PREPARATION
John T. Maynard, Brandywine Hundred, Del., assignor to
E. I. du Pont de Nemours and Company, Wilmington,
Del., a corporation of Delaware
No Drawing. Filed Mar. 7, 1961, Ser. No. 93,860
14 Claims. (Cl. 260—653.3)

This application is a continuation-in-part of my copending application Serial No. 12,973, filed March 7, 1960, now abandoned.

This invention relates to a novel process for preparing fluorinated compounds. In addition, this invention relates to novel 2-hydroheptafluorobutenes.

Fluorine-containing compounds are of great potential value for a wide variety of purposes. However, use of many of these compounds is severely limited because of the lack of economically practical methods for their preparation. This invention provides a continuous process for the preparation of a variety of fluorine-containing compounds, which method is economically more attractive than methods heretofore disclosed in the art.

While the prior art describes various procedures for preparing fluorine-containing compounds, in general, these procedures have involved prolonged reaction under rather severe conditions. It is not possible from these disclosures to predict the conditions necessary to carry out a continuous process in which the fluorinated compound is removed continuously from the reaction medium.

It is an object of the present invention to provide a novel process for preparing fluorinated compounds. A further object is to provide novel 2-hydroheptafluorobutenes. A still further object is to provide a process for the preparation of these 2-hydroheptafluorobutenes. Other objects will appear hereinafter.

These and other objects of this invention are accomplished by a process of continuously preparing fluorinated compounds containing at least 3 carbon atoms which comprises maintaining at about 150 to 250° C. an agitated suspension of an alkali metal fluoride wherein the alkali metal is selected from the group consisting of potassium, cesium and rubidium in a solvent having a boiling point of at least about 150° C., which solvent is selected from the group consisting of lower carboxylic acid amides, lower alkyl sulfoxides, lower alkyl sulfones, cyclic alkylene sulfones containing from 5 to 6 members in the ring, cyclic alkylene carbonates containing from 5 to 6 members in the ring, lactones containing from 5 to 7 atoms in the ring, and lactams containing from 5 to 7 atoms in the ring; continuously adding to said suspension a polychlorohydrocarbon compound which contains at least 3 carbon atoms and continuously removing the formed fluorinated compound as a vapor; said polychlorohydrocarbon compound being a hydrocarbon compound where at least 50 percent of the hydrogen atoms have been replaced by chlorine.

The novel compounds 2-hydroheptafluorobutene-2 and 2-hydroheptafluorobutene-1 may be prepared by the above-described process from hexachloro-1,3-butadiene.

The polychlorohydrocarbon compounds which are used as starting materials in the process of this invention are aliphatic and cycloaliphatic hydrocarbon compounds having at least 3 carbon atoms and having at least 50 percent of the hydrogen atoms replaced by chlorine. Thus, these compounds consist solely of carbon, chlorine and, in some instances, hydrogen. It is preferred that these polychlorohydrocarbon compounds contain not more than about 12 carbon atoms. Representative compounds which may be used include saturated acyclic compounds such as octachloropropane, heptachloropropanes and hexachloropropanes; acyclic compounds containing one or more carbon-to-carbon double bonds such as hexachloropropene, 3-hydropentachloropene, octachlorobutenes, heptachlorobutenes, hexachlorobutenes, hexachloro-1,3-butadiene, and perchloro-1,5-hexadiene; saturated carbocyclic compounds such as perchlorocyclopentane and perchlorocyclohexane; and carbocyclic compounds containing one or two carbon-to-carbon double bonds in the ring such as octachlorocyclopentene.

As indicated above, the polychlorohydrocarbon compounds are added to an agitated suspension of an alkali metal fluoride which is either potassium fluoride, cesium fluoride, or rubidium fluoride. If desired, mixtures of these alkali metal fluorides may be used. The alkali metal fluoride should be finely divided and anhydrous. The amount of alkali metal fluoride to be used depends upon the number of chlorine atoms to be replaced in the polychlorohydrocarbon starting material. In order to replace all of the chlorine atoms, at least one mole of alkali metal fluoride should be used per mole of chlorine to be replaced. Preferably, at least 1.1 mole of alkali metal fluoride should be used for each chlorine atom to be replaced. A greater amount may be used, but it is usually not necessary to use more than 3 moles of alkali metal floride per mole of chlorine to be replaced.

The solvent which is employed in the process of this invention should have a boiling point of at least 150° C. so that it does not distill out of the reaction mixture and, of course, should be liquid at the reaction temperature. It is preferred that the solvent have a boiling point of about 10° C. above the temperature of the reaction. Representative solvents which may be used include the lower carboxylic acid amides and preferably those containing from 1 to 4 carbon atoms such as formamide, acetamide, propionamide, butyramide, and isobutyramide, and their N-alkl or N,N-diaklyl derivatives in which the alkyl groups are lower alkyl; lower alkyl sulfoxides and sulfones and preferably those containing from 1 to 4 carbon atoms, such as dimethyl sulfone, dimethyl sulfoxide, diethyl sulfone, diethyl sulfoxide, dibutyl sulfone, and dipropyl sulfoxide; cyclic alkylene sulfones, and carbonates containing from 5 to 6 members in the ring, such as tetramethylene sulfone, pentamethylene sulfone, ethylene carbonate, 1,2-propylene carbonate, and 1,3-butylene carbonate; and lactones and lactams containing from 5 to 7 atoms in the ring such as 2-pyrrolidone, N-methyl-2-pyrrolidone, caprolactam, γ-butyrolactone, and 2-piperidone. The preferred solvent is N-methyl-2-pyrrolidone because of its ready availability and high boiling point. The amount of solvent to be used is not critical except that sufficient solvent should be present during the reaction to suspend the particles of the alkali metal fluoride and to provide intimate contact of the fluoride with the polychlorohydrocarbon reactant.

The process is carried out using any conventional equipment which will provide means for the continuous addition of the polychlorohydrocarbon starting material to a slurry or agitated suspension containing the alkali metal fluoride suspended in the solvent and for the continuous removal of volatile products. The solvent-fluoride slurry is first brought to the desired temperature and is maintained at this temperature during the continuous addition of the polychlorohydrocarbon reactant. It is preferred to provide agitation to assure intimate contact of the polychlorohydrocarbon reactant with the metal fluoride. Optionally, the solvent-fluoride slurry may also be continuously fed into and withdrawn from the reaction vessel. A slow sweep of an inert gas such as nitrogen may be passed through the reaction vessel to assist in removal of volatile products. The volatile products may be collected by conventional methods such as by condensation, solution in a solvent, etc. In some cases it may be desirable to maintain the reaction temperature for a short time after addition of the starting material is complete in order to recover the maximum amount of fluorinated product. This is not essential and is usually not necessary.

Although somewhat higher or lower temperatures may be used, the reaction is preferably carried out in the range of about 150° C. to about 250° C. Below 150° C. the reaction proceeds too slowly, and temperatures above 250° C. are not necessary. The temperature will depend to a certain extent upon the boiling point of the solvent being used. For example, when N-methyl-2-pyrrolidone is used as the solvent, a temperature range of 190–200° C. may be used. When dimethylformamide is used as the solvent, a temperature of only about 150° C. is attainable. When temperatures in the lower part of the range are used, the yield of volatile product may be somewhat lower than when the higher temperatures are used. The reaction is normally conducted at atmospheric pressure; however, lower or higher pressures may be used.

The compounds which are obtained as a result of the process of this invention are fluorinated materials wherein the chlorine atoms present in the starting compound have been partially or completely replaced by fluorine. In general, more than 50 percent of the chlorine atoms will be replaced by fluorine. The conversions accomplished appear in many cases to be the result of a series of reactions that may include dehydrochlorination, dechlorination, addition of hydrogen fluoride and chlorine to double bonds, and direct replacement of chlorine atoms by fluorine atoms.

The process of the present invention provides a highly efficient method for the preparation of fluorinated compounds having a wide variety of uses. In many cases the compounds are useful as propellents and refrigerants, either alone or in combination with other fluorinated hydrocarbons such as difluorodichloromethane. They are useful as solvents and they may also be used as intermediates for the preparation of other fluorine-containing compounds.

Two of the compounds which may be prepared according to this invention are the novel compounds 2-hydroheptafluorobutene-2 and 2-hydroheptafluorobutene-1. These compounds may be represented by the formulae $CF_3-CH=CF-CF_3$ and $CF_2=CH-CF_2-CF_3$ respectively. These compounds are colorless liquids of low boiling points. The structures of these compounds have been assigned on the basis of their infrared spectra, nuclear magnetic resonance studies and chemical oxidation to known fluorinated carboxylic acids. From these studies it also appears that the 2-hydroheptafluorobutene-2 exists in cis- and trans-isomeric forms. When these two compounds are freshly prepared, the major portion of the mixture of isomers distills in the range of 11–15° C. at atmospheric pressure. The remainder boils from 15–18° C. On standing for a few weeks in a stainless steel container, the boiling range changes to 7–10° C. at atmospheric pressure. It is believed that this is the result of isomerization of the 2-hydroheptafluorobutene-2 from the cis-form to the trans-form.

The novel 2-hydroheptafluorobutenes are useful as intermediates in the preparation of other fluoro compounds. For example, they may be chlorinated to yield chlorofluorobutanes which are stable heat transfer liquids. They may be oxidized to mixtures of trifluoroacetic acid and pentafluoropropionic acid. The acids are useful in acylating sterically hindered carboxy acids, as solvents for proteins and as catalysts for hydrolysis of esters. The 2-hydroheptafluorobutenes are also useful as inert propellents, where, because of their molecular configuration and consequent difference in solubility, they may advantageously be substituted for the conventional fluorinated propellents in many cases. They may also be utilized as gaseous dielectrics. They may be used as refrigerants, either alone or in combination with other gaseous fluorinated compounds such as dichlorodifluoromethane.

The following examples will better illustrate the nature of the present invention; however, the invention is not intended to be limited to these examples. Parts are by weight unless otherwise indicated.

A. The experiments described in Examples 1 to 7 are conducted by the following method:

The reaction is carried out in a flask fitted with an agitator, a gas inlet for a nitrogen sweep, an inlet for continuous feed of the polychlorohydrocarbon starting material, and a Claisen head vented to a series of traps cooled by solid carbon dioxide. An anhydrous alkali metal fluoride and the solvent are placed in the flask. Glass beads (50–150 grams) are added to provide an abrading action to expose fresh reaction surfaces. The reaction mixture is agitated during the entire process. The reaction mixture is heated to the desired temperature and the temperature is maintained while the polychlorohydrocarbon starting material is introduced continuously through the gas inlet. A slow sweep of nitrogen is maintained to assist in carrying the volatile products to the trap system where they are condensed. The evolution of product starts essentially immediately and the rate of evolution depends on the rate of addition of starting material. In many cases evolution of product is essentially complete by the time the polychlorohydrocarbon addition is stopped. In other cases, heating and nitrogen sweep is maintained until evolution of product is complete.

*Example 1*

The process described in paragraph A is carried out using the following materials:

| | Grams |
|---|---|
| Potassium fluoride | 174 |
| N-methyl-2-pyrrolidone | 500 |
| Hexachloropropene | 83 |

The hexachloropropene is added continuously over a period of two hours while the temperature is maintained at 190–200° C. Evolution of volatile products is essentially complete within 30 minutes after addition of hexachloropropene is finished. The product consists of 28 parts of a mixture of highly fluorinated compounds, including 2,2-dichloroperfluoropropane, 2-chloro-2-hydroperfluoropropane, and olefinic components. Analysis of the reaction mixture shows that 80 percent of the chlorine in the starting hexachloropropene has been converted to chloride ion.

When, instead of N-methyl-2-pyrrolidone, one of the below-listed materials is used as a solvent, in the temperature range indicated below, essentially the same products are obtained.

| | ° C. |
|---|---|
| N,N-dimethylformamide | 150–165 |
| Dimethyl sulfoxide | 150 |
| Dimethyl sulfone | 150–240 |
| Tetramethylene sulfone (tetrahydrothiophene, 1-dioxide) | 150–200 |
| Ethylene carbonate (1,3-dioxolane-2-one) | 150–200 |

*Example 2*

The process described in paragraph A is carried out using the following materials:

| | Grams |
|---|---|
| Potassium fluoride | 87 |
| N-methyl acetamide | 250 |
| Hexachloro-1,3-butadiene | 43.5 |

The hexachloro-1,3-butadiene is added continuously during a period of two hours while the temperature is maintained at 184–195° C. A 33 percent yield of 2-hydroperfluorobutene-2 is obtained.

When the experiment is repeated using N,N-dimethylacetamide as the solvent instead of N-methylacetamide and a tempearture of about 165° C., a slightly lower yield of the 2-hydroperfluorobutene-2 is obtained. A similar result is obtained when the process is carried out using formamide as the solvent and maintaining the temperature at about 150° C. The different temperatures are necessary because of the differences in the boiling points of the respective solvents.

*Example 3*

The process described in paragraph A is carried out using the following materials:

| | Grams |
|---|---|
| Potassium fluoride | 116 |
| Dimethyl sulfone | 300 |
| Hexachloro-1,3-butadiene | 43.5 |

The hexachloro-1,3-butadiene is added continuously during a period of 70 minutes while the temperature is maintained at 190–195° C. After another hour, during which time the temperature is allowed to rise to 240° C., evolution of product is complete. The volatile product collected in the trap system is distilled to give a 51 percent yield of 2-hydroperfluorobutene-2.

*Example 4*

The process described in paragraph A is carried out using the following materials:

| | Grams |
|---|---|
| Cesium fluoride | 228 |
| N-methyl-2-pyrrolidone | 400 |
| Hexachloro-1,3-butadiene | 43.5 |

The hexachloro-1,3-butadiene is added continuously during a period of 75 minutes while the temperature is maintained at 195° C. A 58 percent yield of 2-hydroperfluorobutene-2 is obtained.

Similar results are obtained when rubidium fluoride is used in place of cesium fluoride.

*Example 5*

The process described in paragraph A is carried out using the following materials:

| | Grams |
|---|---|
| Potassium fluoride | 174 |
| N-methyl-2-pyrrolidone | 450 |
| Octachloropropane (added as a solution in 75 g. of N-methyl-2-pyrrolidone) | 58 |

The solution of octachloropropane is added continuously to the reaction vessel during a 90-minute period while the temperature is maintained at 195–200° C. After addition of the octachloropropane is complete, temperature and nitrogen sweep are continued for an additional hour, after which time the evolution of product is complete. The product is largely 2,2-dichloroperfluoropropane, having a boiling point of 33° C. and a refractive index $n_D^{20}$ 1.3032, which is obtained in about a 60 percent yield. Analysis of the reaction mixture shows that 79 percent of the chlorine of the starting material is converted to chloride ion.

*Example 6*

The process described in paragraph A is carried out using the following materials:

| | Grams |
|---|---|
| Potassium fluoride | 116 |
| N-methyl-2-pyrrolidone | 350 |
| Octachlorocyclopentene (added as a solution in 75 grams of N-methyl-2-pyrrolidone) | 43 |

The solution of octachlorocyclopentene is added continuously to the suspension of the salt in the solvent during a 45-minute period while the temperature is maintained at 195–200° C. Evolution of volatile material, found to be essentially pure octafluorocyclopentene, B.P. 26.2° C., is complete after an additional 15 minutes.

*Example 7*

The procedure described in paragraph A is carried out using the following materials:

| | Grams |
|---|---|
| Potassium fluoride | 116 |
| N-methyl-2-pyrrolidone | 250 |
| 1,1,2,2,3,3-hexachloropropane | 54 |

The hexachloropropane is added continuously during a period of one hour while the temperature is maintained at 195–200° C. The volatile products are found to consist largely of 2,2-dihydrohexafluoropropane (B.P. 3–5° C.) and 2-chloro-1-hydro-tetrafluoropropene (B.P. 17–18° C.). These compounds are identified by means of nuclear magnetic resonance spectroscopy.

Essentially the same results are obtained when 1,1,1,2,3,3-hexachloropropane is used as reactant instead of 1,1,2,2,3,3-hexachloropropane.

*Example 8*

The equipment consists of a reaction vessel equipped for distillation with a receiver which in turn is connected to a cold trap cooled with solid carbon dioxide. The reaction vessel is charged with 480 parts of dimethyl formamide, 87 parts of hexachloro-1,3-butadiene and 232 parts of anhydrous potassium fluoride and then heated at 150° C. while stirring for 5½ hours. During the last 1½ hours, unreacted hexachloro-1,3-butadiene and a portion of the dimethyl formamide are distilled over into the receiver. From the cold trap, there is recovered 3 parts of a colorless liquid mixture of the isomeric 2-hydroheptafluorobutenes.

*Example 9*

Using the equipment of Example 8, a mixture of 500 parts of N-methyl pyrrolidone, 87 parts of hexachloro-1,3-butadiene and 232 parts of anhydrous potassium fluoride is stirred and heated at 190–200° C. for 3 hours and then 200 parts of the mass is allowed to distill out. From the cold trap there is recovered 28 parts of 2-hydroheptafluorobutenes. This is a 46 percent yield based on the hexachloro-1,3-butadiene.

*Example 10*

A reaction vessel is equipped with an addition inlet, an agitator, an inlet for sweeping with inert gas, and an outlet leading to a cold trap cooled with solid carbon dioxide. The reaction vessel is charged with 500 parts of N-methyl pyrrolidone, and 174 parts of anhydrous potassium fluoride. About 50 parts of glass beads is added to abrade the potassium fluoride during agitation. The temperature is then raised to 180–195° C. while agitating. A slow stream of nitrogen is then passed through the vessel while 87 parts of hexachloro-1,3-butadiene is added slowly and uniformly over a period of 3 hours. The 2-hydroheptafluorobutenes formed are swept into the cold trap by the nitrogen stream. 34 parts is collected which is a 56 percent yield based on the hexachlorobutadiene.

The products from Examples 9 and 10 are combined and distilled through a low-temperature column. A major portion distills over a range of 11–15° C. at atmospheric pressure. Analysis of the nuclear magnetic resonance spectrum of this fraction shows that at least 90 percent of it must have the structure $CF_3—CH=CF—CF_3$. The remainder of the material distills at 15–18° C. This fraction is oxidized with alkaline potassium permanganate and the resulting acids are esterified with ethanol. The mixed esters distill at 66–69° C. at atmospheric pressure and has a refractive index $n_D^{25}$ 1.3060. An infrared absorption spectrum shows all the bands typical of ethyl trifluoroacetate and ethyl pentafluoropropionate, both known compounds. This is clear evidence of the presence of both $CF_3—CH=CF—CF_3$ and $CF_2=CH—CF_2—CF_3$ in the fraction. The nuclear magnetic resonance spectrum of the 11–15° C. fraction, measured at 40 megacycles against trifluoroacetic acid as a zero standard, shows doublet bands at +620 cycles per second and +39 cycles per second. These are attributed to the presence of two different $CF_3$-groups, each being a doublet because of the possibility of cis-/transisomerism. A third fluorine peak, due to a single fluorine atom, is present at −1682 cycles per second. These bands account for about 90 percent of the sample and can be attributed to the structure $CF_3-CH=CF-CF_3$.

*Example 11*

The procedure of Example 10 is repeated except that N-methyl acetamide is substituted for the N-methyl pyrrolidone. A 33 percent yield of 2-hydroheptafluorobutenes is obtained.

When this example is repeated using dimethyl acetamide instead of the N-methyl acetamide, it is necessary to decrease the temperature to 160–165° C. because of the lower boiling point of the amide.

*Example 12*

Two runs are made in the same way as Example 10 except the quantities are doubled. The resulting 2-hydroheptafluorobutene products are combined and distilled as before, collecting the material boiling at 10–18° C. The distillate is put in a stainless steel cylinder and set aside for about a month. The product is then redistilled. This time 85 percent of the product distills at 7–8° C. at atmospheric pressure and the balance at 8–10° C. Infrared spectral analysis of the 7–8° C. fraction shows substantially the same pattern as the product which has distilled at 10–15° C. A vapor phase chromatographic analysis of the 7–8° C. fraction shows that it consists of 95.3 percent of a single component, 2.3 percent of a second component immediately adjacent in the elution pattern, and the balance a number of minor impurities. Analogy with other fluoroolefins indicates that the major product is the trans-isomer. It is believed that the cis-form, which is first formed, isomerizes on standing.

As many widely different embodiments of this invention may be made without departing from the spirit and scope thereof, it is to be understood that this invention is not limited to the specific embodiments thereof except as defined in the appended claims.

What is claimed is:

1. A compound selected from the group consisting of 2-hydroheptafluorobutene-2 and 2-hydroheptafluorobutene-1.

2. A compound of the formula $$CF_3-CH=CF-CF_3$$

3. A compound of the formula $$CF_2=CH-CF_2-CF_3$$

4. A process for preparing 2-hydroheptafluorobutenes which comprises heating hexachloro-1,3-butadiene with potassium fluoride in an organic carboxylic acid amide solvent at a temperature of from about 150 to 200° C.

5. A process according to claim 4 wherein the solvent is dimethyl formamide.

6. A process according to claim 4 wherein the solvent is N-methyl pyrrolidone.

7. A process according to claim 4 wherein the solvent is N-methyl acetamide.

8. A process of continuously preparing fluorinated compounds containing from about 3 to 12 carbon atoms from polychlorinated aliphatic and cycloaliphatic hydrocarbon compounds wherein at least 50% of the chlorine atoms thereof are replaced by fluorine atoms which comprises maintaining at about 150° to 250° C. an agitated suspension of an alkali metal fluoride wherein the alkali metal is selected from the group consisting of potassium, cesium and rubidium in a solvent having a boiling point of at least about 150° C., which solvent is selected from the group consisting of lower carboxylic acid amides, lower alkyl sulfoxides, lower alkyl sulfones, cyclic alkylene sulfones containing from 5 to 6 members in the ring, cyclic alkylene carbonates containing from 5 to 6 members in the ring, lactones containing from 5 to 7 atoms in the ring, and lactams containing from 5 to 7 atoms in the ring; continuously adding to said suspension a polychlorinated hydrocarbon compound which contains from about 3 to 12 carbon atoms and continuously removing the formed fluorinated compound as a vapor; said polychlorinated hydrocarbon compound being an aliphatic or cycloaliphatic hydrocarbon compound wherein at least 50 percent of the hydrogen atoms have been replaced by chlorine.

9. A process according to claim 8 wherein the alkali metal fluoride is potassium fluoride.

10. A process according to claim 8 wherein the solvent is N-methyl-2-pyrrolidone and the temperature is maintained at about 190 to 200° C.

11. A process according to claim 8 wherein the polychlorinated hydrocarbon is hexachloropropene.

12. A process according to claim 8 wherein the polychlorinated hydrocarbon is hexachloro-1,3-butadiene.

13. A process according to claim 8 wherein the polychlorinated hydrocarbon is octachloropropane.

14. A process according to claim 8 wherein the polychlorinated hydrocarbon is octachlorocyclopentene.

References Cited by the Examiner

UNITED STATES PATENTS

| 2,842,603 | 7/1958 | Miller | 260—653.3 |
| 2,918,501 | 12/1959 | Brehm et al. | 260—653.3 |
| 2,983,764 | 5/1961 | Knaack | 260—653.3 |
| 3,024,290 | 3/1962 | Henne | 260—653.3 |

OTHER REFERENCES

Fields et al.: Proceedings of the Chemical Society 1960, 22, cited in Chemical Abstracts 57, 9637h (1962).

Houben-Weyl, Methoden Der Organischen Chemie, Georg Thieme Verlag, Stuttgart (1962), vol. 5/3, pp. 153–157.

Hudlicky, Chemistry of Fluorine Compounds, The Macmillan Co., New York (1962), pp. 104–110.

Lovelace, Aliphatic Fluorine Compounds, Reinhold Pub. Co., New York (1958), pp. 2, 3, 42.

Tullock et al.: J. Org. Chem., vol. 25, pp. 2016–19 (1960).

LEON ZITVER, *Primary Examiner.*

ALPHONSO D. SULLIVAN, *Examiner.*

DANIEL D. HORWITZ, JOSEPH R. LIBERMAN, J. W. WILLIAMS, K. V. ROCKEY, *Assistant Examiners.*